US010146748B1

(12) United States Patent
Barndollar et al.

(10) Patent No.: US 10,146,748 B1
(45) Date of Patent: Dec. 4, 2018

(54) EMBEDDING LOCATION INFORMATION IN A MEDIA COLLABORATION USING NATURAL LANGUAGE PROCESSING

(71) Applicant: Google Inc., Mountain View, CA (US)

(72) Inventors: Eric W. Barndollar, Mountain View, CA (US); Aaron Eidelson, San Francisco, CA (US); Holger Meyers, Mountain View, CA (US)

(73) Assignee: Google LLC, Mountain View, CA (US)

( * ) Notice: Subject to any disclaimer, the term of this patent is extended or adjusted under 35 U.S.C. 154(b) by 423 days.

(21) Appl. No.: 14/482,421

(22) Filed: Sep. 10, 2014

(51) Int. Cl.
*G06F 17/22* (2006.01)
*H04L 12/58* (2006.01)
*G06F 17/30* (2006.01)
*H04W 4/02* (2018.01)

(52) U.S. Cl.
CPC .... *G06F 17/2235* (2013.01); *G06F 17/30061* (2013.01); *H04L 51/10* (2013.01); *H04W 4/02* (2013.01)

(58) Field of Classification Search
CPC ...... G06F 17/22; G06F 17/2235; G06F 17/24; G06F 17/241; G06F 17/242
USPC ................ 715/205, 230, 231, 233
See application file for complete search history.

(56) References Cited

U.S. PATENT DOCUMENTS

| 7,177,879 | B2* | 2/2007 | Flank | G06F 17/30253 |
| 7,437,295 | B2* | 10/2008 | Pitts, III | G06F 17/3043 |
| | | | | 704/270 |
| 7,913,179 | B2* | 3/2011 | Sheha | H04L 51/04 |
| | | | | 701/532 |
| 8,631,070 | B2* | 1/2014 | Vance | G06Q 10/109 |
| | | | | 709/204 |
| 8,818,350 | B2* | 8/2014 | Brush | H04M 3/38 |
| | | | | 455/418 |
| 8,832,789 | B1* | 9/2014 | Gossweiler, III | H04W 64/003 |
| | | | | 455/411 |
| 8,957,900 | B2* | 2/2015 | Lau | G06T 13/00 |
| | | | | 345/473 |
| 9,769,605 | B2* | 9/2017 | Shan | H04W 4/023 |
| 2006/0167913 | A1* | 7/2006 | Tam | G06F 17/30879 |
| 2007/0226058 | A1* | 9/2007 | Lorenzen | G06Q 30/02 |
| | | | | 705/14.41 |
| 2008/0010259 | A1* | 1/2008 | Feng | G06F 17/3087 |

(Continued)

FOREIGN PATENT DOCUMENTS

WO 2014072767 5/2014

OTHER PUBLICATIONS

Your HTC Desire User Guide; 2010; HTC Corporation; pp. 1-211.*
IP.com, "Method and System for Generating One or More Action Items based on a Conversation," 3 pages, Jul. 24, 2014.

*Primary Examiner* — Andrew R Dyer
(74) *Attorney, Agent, or Firm* — Lowenstein Sandler LLP

(57) ABSTRACT

Systems and methods are disclosed for embedding location information in a media collaboration using natural language processing. A method includes identifying, using natural language processing (NLP) techniques, a location discussed by one or more users in a media collaboration, determining a location context of at least one of the one or more users, the location context comprising a geographic location of a device of the at least one user, identifying, based on the identified location and the location context, location information corresponding to the identified location, and providing access to the location information in the media collaboration.

25 Claims, 8 Drawing Sheets

(56) References Cited

U.S. PATENT DOCUMENTS

| | | | |
|---|---|---|---|
| 2008/0071742 A1* | 3/2008 | Yang | G06F 17/30864 |
| 2008/0140684 A1* | 6/2008 | O'Reilly | G06F 17/30707 |
| 2008/0182598 A1* | 7/2008 | Bowman | G01C 21/26 |
| | | | 455/466 |
| 2008/0256192 A1* | 10/2008 | Pinard | G06Q 30/02 |
| | | | 709/206 |
| 2008/0301581 A1* | 12/2008 | Baek | G06F 17/276 |
| | | | 715/810 |
| 2009/0156229 A1* | 6/2009 | Hein | G01C 21/20 |
| | | | 455/456.1 |
| 2009/0158200 A1* | 6/2009 | Palahnuk | G06Q 30/00 |
| | | | 715/781 |
| 2009/0276419 A1* | 11/2009 | Jones | G06F 17/30637 |
| 2009/0325603 A1* | 12/2009 | Van Os | H04W 4/02 |
| | | | 455/456.2 |
| 2010/0192221 A1* | 7/2010 | Waggoner | G06F 17/30392 |
| | | | 726/19 |
| 2010/0262915 A1* | 10/2010 | Bocking | H04W 4/02 |
| | | | 715/733 |
| 2010/0325194 A1* | 12/2010 | Williamson | H04W 4/02 |
| | | | 709/203 |
| 2011/0081920 A1* | 4/2011 | Hung | G06Q 10/109 |
| | | | 455/456.3 |
| 2011/0160986 A1* | 6/2011 | Wu | G08G 1/0962 |
| | | | 701/117 |
| 2011/0164058 A1* | 7/2011 | Lemay | G06F 3/0488 |
| | | | 345/651 |
| 2011/0211813 A1* | 9/2011 | Marks | G06F 17/3089 |
| | | | 386/297 |
| 2011/0289433 A1* | 11/2011 | Whalin | G06F 17/30964 |
| | | | 715/753 |
| 2011/0306366 A1* | 12/2011 | Trussel | H04L 63/0807 |
| | | | 455/457 |
| 2012/0278164 A1 | 11/2012 | Spivack et al. | |
| 2012/0303452 A1 | 11/2012 | Xue et al. | |
| 2013/0073336 A1* | 3/2013 | Heath | G06Q 30/02 |
| | | | 705/7.29 |
| 2013/0097054 A1* | 4/2013 | Breitenbach | G06Q 30/06 |
| | | | 705/26.8 |
| 2013/0159920 A1* | 6/2013 | Scott | G06F 17/3087 |
| | | | 715/780 |
| 2013/0173253 A1* | 7/2013 | Gnech | G06F 17/28 |
| | | | 704/9 |
| 2013/0317808 A1 | 11/2013 | Kruel et al. | |
| 2014/0081633 A1* | 3/2014 | Badaskar | G06F 17/30023 |
| | | | 704/235 |
| 2014/0195621 A1* | 7/2014 | Rao DV | H04L 51/02 |
| | | | 709/206 |
| 2014/0229860 A1* | 8/2014 | Rogers | G06Q 10/06311 |
| | | | 715/753 |
| 2014/0245224 A1* | 8/2014 | Roh | G06F 9/44505 |
| | | | 715/808 |
| 2014/0258905 A1* | 9/2014 | Lee | G06F 9/4443 |
| | | | 715/770 |
| 2015/0038161 A1* | 2/2015 | Jakobson | H04W 4/02 |
| | | | 455/456.1 |
| 2015/0121290 A1* | 4/2015 | Li | G06F 17/2785 |
| | | | 715/780 |
| 2015/0121291 A1* | 4/2015 | Scott | G06F 17/3064 |
| | | | 715/780 |
| 2015/0127748 A1* | 5/2015 | Buryak | H04L 51/32 |
| | | | 709/206 |
| 2015/0134235 A1* | 5/2015 | Shan | G01C 21/26 |
| | | | 701/409 |
| 2015/0141060 A1* | 5/2015 | Shan | H04L 51/32 |
| | | | 455/456.3 |
| 2015/0200981 A1* | 7/2015 | Garrick | H04L 43/10 |
| | | | 709/204 |
| 2015/0211866 A1* | 7/2015 | Tang | H04L 51/20 |
| | | | 701/522 |
| 2017/0268886 A1* | 9/2017 | Tang | H04L 51/20 |

* cited by examiner

EMBEDDING LOCATION INFORMATION IN A MEDIA COLLABORATION USING NATURAL LANGUAGE PROCESSING

TECHNICAL FIELD

This disclosure relates to the field of computer-based conversational messaging, in particular, to embedding location information in a media collaboration using natural language processing.

BACKGROUND

Media collaborations over the Internet (e.g., video conferences, telemedicine, chat conversations, etc.) are becoming increasingly common as broadband access and applications that take advantage of broadband connectivity proliferate. Applications for supporting media collaborations may be browser-based, or may run independently of a browser.

SUMMARY

The following presents a simplified summary of various aspects of this disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the present disclosure, a method includes identifying, using natural language processing (NLP) techniques, a location discussed by one or more users in a media collaboration, determining a location context of at least one of the one or more users, the location context comprising a geographic location of a device of the at least one user, identifying, based on the identified location and the location context, location information corresponding to the identified location, and providing access to the location information in the media collaboration.

In one implementation, the location comprises a place that may include a business, a home, a destination, or a school. In addition, the location information may include at least one of a map, an address, latitude/longitude coordinates, navigation options, pictures, reviews, website link, application link, images, animations, music, or videos. Furthermore, the location context may be determined based on at least one of global positioning system (GPS) data, cellular data signals, sensor data, Wi-Fi signals, internet protocol (IP) addresses, web application programming interface (API) input, or direct input from the at least one user.

In another implementation, providing the access in the method may further include embedding a selectable link to the location information in the media collaboration. Providing the access of the method may also include providing a preview of the location information to the at least one user; and receiving permission from the at least one user to share the location information with other users in the media collaboration. The at least one user may be a user that initially discussed the location. Lastly, in one implementation, the media collaboration may include at least one of a live video recording, a pre-recorded video, a video chat, or a text-based chat.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
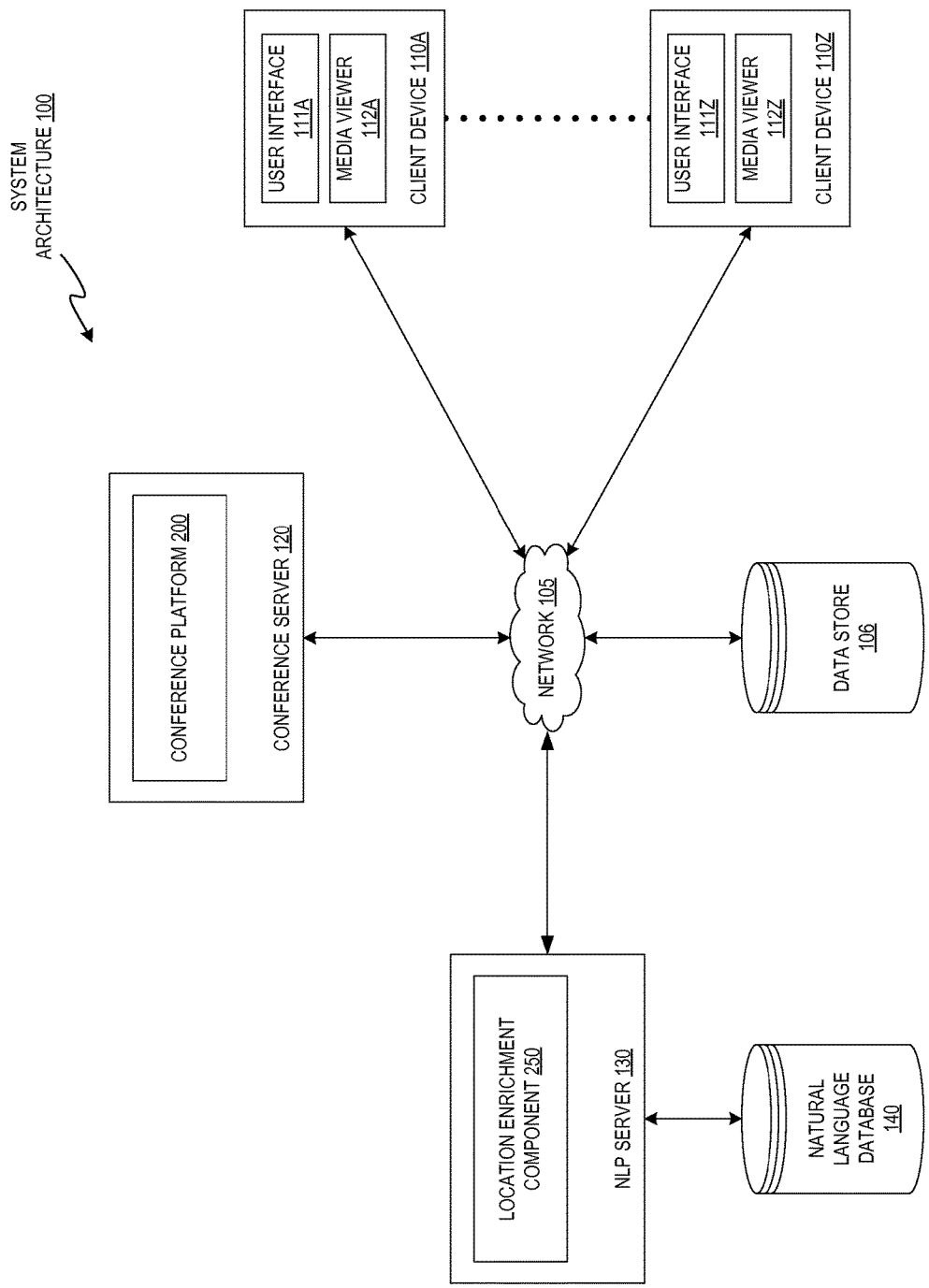
FIG. 1 illustrates an example system architecture in accordance with an implementation of the disclosure.

Aspects and implementations of the present disclosure are directed to embedding location information in a media collaboration using natural language processing. The systems and methods disclosed can be applied to live content, pre-recorded content, and media collaborations (e.g., audio and/or video conferences, audio and/or video chats, audio and/or video conference rooms, audio and/or video chat rooms, etc.) in which content/media streams (e.g., live audio and/or video content, recorded audio and/or video content, etc.), which are transmitted by devices of one or more participants/users, are combined into a composite content/media stream.

As used herein, the term "media collaboration" refers to a conversation held between two or more users in which spoken or written language of the conversation is exchanged between the two or more users using respective client devices of the two or more users. Media collaborations may include live or pre-recorded content and may be in the form of video and/or audio conferences, text-based chats, slideshow presentations, online lectures/seminars, etc.

As used herein, the term "media item" includes audio clips, movie clips, TV clips, and music videos, as well as amateur content such as video blogging, short original videos, pictures, photos, other multimedia content, etc. Media items may also refer to other types of content, including representations of products (e.g., product listings from online merchants), articles (e.g., reviews, news articles, product descriptions, etc.), chat dialog, slideshow presentations, or any other type of contextual data that may be presented using a display and/or audio device. Media item may also be referred to herein as "content item", "content", "media", and so on.

Described herein in various implementations are technologies that allow for the extraction of locations (e.g., of people or places) being discussed in media collaborations using natural language processing (NLP) techniques. NLP is used to perform location extraction from content associated with a media collaboration (e.g., live video/audio streams, pre-recorded video/audio streams, text-based conversations, etc.). For example, spoken or typed language can be parsed to identify locations being discussed using various knowledge extraction technologies as would be appreciated by one of ordinary skill in the art. In the context of spoken language, a speech-to-text voice recognition technology may be first applied to the spoken language, and then the NLP techniques can be applied to the recognized text.

The extracted locations can be used in conjunction with location context of users/participants in the media collaboration to identify location information corresponding to the location. The location context of users/participants may refer to a current location of a user or user's device during the media collaboration. In one implementation, the location context of a user is determined based on one or more of a variety of inputs including, but not limited to, Wi-Fi signals, global positioning system (GPS) signals, cellular communication signals, Internet Protocol (IP) address information, web application programming interface (API) information, direct input from the user, and/or other sensor or configuration data associated with the user's device.

The location information may include, but is not limited to, a map, an address, latitude/longitude coordinates, navigation options, pictures, reviews, website link, application link, images, animations, music, videos, and so on. The location information may be identified using location association techniques that determine geographic sites based on the extracted location and the location context of the users (if any). For example, if a restaurant chain (e.g., "extracted location") with many locations is being discussed, the location association technique may identify a particular location (e.g., geographic site) of the restaurant chain that is nearest a location(s) of the user(s) (e.g., location context).

In addition, the location association techniques may utilize a certainty threshold to determine whether (and which) geographic site should be returned for an extracted location and location context combination. The certainty threshold may represent a probability that a geographic site relates to the extracted location/location context. If a probability that the geographic site relates to the extracted location/location context does not exceed the certainty threshold, then it is not returned as a precise geographic site. When location information is identified, it may be embedded in the media collaboration in order to enrich the discussion of the location.

Some implementations described herein may be integrated into user interfaces operated on various client devices. A user interface may display the media collaboration and also display the location information to enrich the media collaboration. The media collaboration may update in real-time as NLP extracts locations from the media collaboration and identifies location information. In some implementations, a user/participant of the media collaboration can be provided as a preview with an option to share identified location information corresponding to a location discussed in the media collaboration with other users/participants in the media collaboration.

Existing media collaboration technologies allow users/participants to manually identify and select location information to embed in the media collaboration. However, these existing media collaboration technologies do not automatically identify locations discussed in the media collaboration and select relevant location information to embed in the media collaboration without user/participant interaction. As such, implementations of the disclosure improve and enrich the media collaboration experience for users/participants in the media collaboration by automating the selection and embedding of relevant location information in the media collaboration.

FIG. 1 illustrates an example system architecture 100, in accordance with an implementation of the disclosure. The system architecture 100 includes client devices 110A-110Z, a network 105, a data store 106, a conference server 120, a natural language processing (NLP) server 130, and a natural language database 140. Each of the various devices of the system architecture 100 may be connected to one another via the network 105. In one implementation, the network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In some implementations, the data store 106 may be cloud-based. One or more of the devices of system architecture 100 may utilize the data store 106 to store public and private data, and data store 106 may be configured to provide secure storage for private data. The data store 106 may be part of or distributed between any of the client devices 110A-110Z, the conference server 120, and the NLP server 130.

In one implementation, the client devices 110A-110Z may include one or more computing devices such as personal computers (PCs), laptops, mobile phones, smart phones, tablet computers, netbook computers etc. Client devices 110A-110Z may also be referred to as "user devices" or "mobile devices". An individual user may be associated with (e.g., own and/or use) one or more client devices (e.g., one or more of client devices 110A-110Z). Client devices 110A-110Z may each be owned and utilized by different users at different geographical locations. Users that participate in media collaborations (e.g., video conferences) may be referred to herein as "conference participants".

The client devices 110A-110Z may each implement the user interfaces 111A-111Z, respectively. Each of user interfaces 111A-111Z may allow a user of the respective client device 110A-110Z to send and receive information to one or more of the conference server 120 and the NLP server 130. For example, one or more of the user interfaces 111A-111Z may be a web browser interface that can access, retrieve, present, and/or navigate content (e.g., web pages such as Hyper Text Markup Language (HTML) pages) provided by the conference server 120. In one implementation, one or more of the user interfaces 111A-111Z may be a standalone application (e.g., a mobile app, conferencing software, etc.), that allows a user of a respective client device 110A-110Z to send and receive information to the conference server 120 and/or the NLP server 130. In one implementation, one or more of the user interfaces 111A-111Z may be conference interfaces that allow conference participants to engage in one or more of video conferencing, audio conferencing, chatting, and or instant messaging. An example user interface (e.g., a graphical user interface window) is described in greater detail with respect to FIG. 3.

Each client device 110A-110Z further includes a media viewer 112A-112Z, respectively. In one implementation, the media viewers 112A-112Z may be applications that allow users to view content, such as images, videos, web pages, documents, etc. For example, the media viewer 112A may be a web browser that can access, retrieve, present, and/or navigate content (e.g., web pages such as Hyper Text Markup Language (HTML) pages, digital media items, etc.) served by a web server. The media viewer 112A may render, display, and/or present the content to a user. The media viewer 112A may also display an embedded media player that is embedded in a web page (e.g., a web page that may provide information about a product sold by an online merchant). In another example, the media viewer 112A may be a standalone application (e.g., a mobile app) that allows users to view digital media items (e.g., digital videos, digital images, electronic books, etc.). In one implementation, media viewers 112A-112Z may further allow for video to be received from one or more sources and displayed within the respective user interfaces 111A-111Z. For example, client device 110A may receive video data from the conference server 120, which may correspond to video streams generated by one or more additional client devices. The media viewer 112A may generate for display (e.g., within the user interface 111A) video corresponding to each of the video streams based on the received video data.

In one implementation, the conference server 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, hardware components, or combinations thereof that may be suitable for implementing the various features described herein. In some implementations, the conference server 120 can enable media collaboration services such as audio and/or video conferences (e.g., among users of client devices 110A-110Z) using, for example, streaming video or voice over IP (VoIP) technologies and may be used for personal, entertainment, business, educational or academically-oriented interactions. The conference server 120 may be dedicated to providing video conferencing services or may provide video conferencing services along with other services including, for example, news services, social networking services and/or content hosting services.

Figure 2:
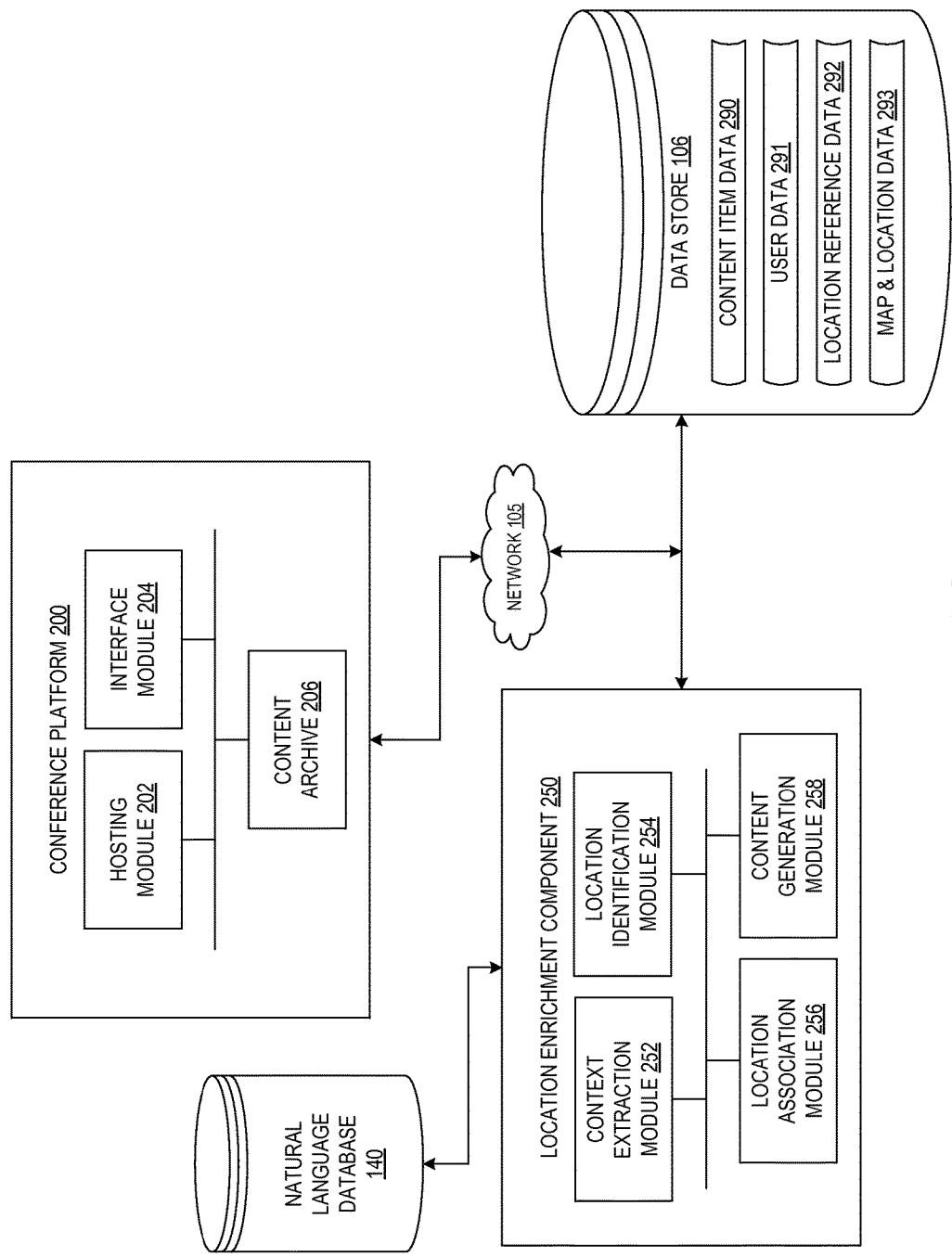
FIG. 2 is a block diagram illustrating a conference platform and a location enrichment component in accordance with an implementation of the disclosure.

In one implementation, the conference server 120 includes or is part of a conference platform 200. The conference platform 200, as illustrated in FIG. 2, includes a hosting module 202, an interface module 204, and a content archive 206. More or less components may be included in the conference platform 200 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

In one implementation, the hosting module 202 may be utilized by the conference platform 200 to initiate and support media collaborations, such as audio/video conferences, chat rooms, video chats, etc. For example, the hosting module 202 may receive requests from users to create media collaboration sessions, may allow users to join existing media collaboration sessions upon receiving requests from the users, may facilitate transmitting invitations to users that permit the users to join existing media collaboration sessions or start new media collaboration sessions, etc.

Figure 3:
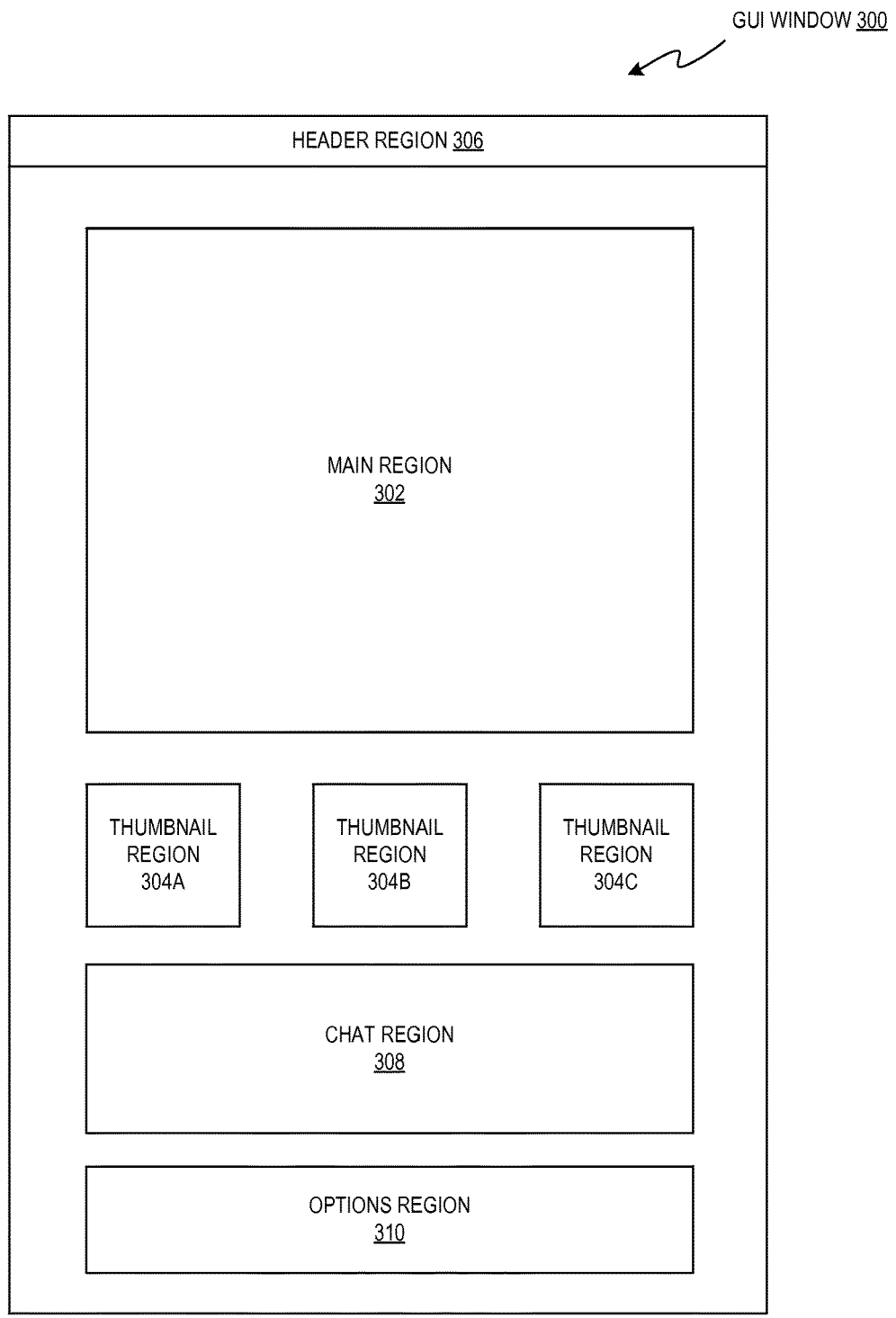
FIG. 3 is a block diagram illustrating an exemplary graphical user interface window of a media collaboration service/application in accordance with an implementation of the disclosure.

In one implementation, the interface module 204 may be utilized by the conference platform 200 to receive multiple audio and/or video streams from one or more of the client devices 110A-110Z of various participants, and generate a composite stream that may include data associated with each of the received streams. The composite stream may then be provided to the one or more client devices 110A-110Z of the various participants in a media collaboration session (e.g., a video conference). In some implementations, the composite stream may include formatting data that can be used by the client devices 110A-110Z for extracting individual video streams and arranging the video streams for presentation by respective user interfaces 111A-111Z. Accordingly, each user/participant of a video conference can simultaneously view some or all of the content streams within a single interface/screen, such as illustrated in FIG. 3.

In some implementations, one or more participants in a media collaboration hosted by the conference platform 200 may provide/project audio content (e.g., a spoken voice of a participant, music, etc.) which, upon being received/perceived by a client device (e.g., one of client devices 110A-110Z), can be transmitted or otherwise provided by the client device as an audio stream that can be incorporated into the media collaboration. In some implementations, such audio streams can be provided independent of a video stream (e.g., a participant providing audio-only input during a media collaboration), while in other implementations such audio streams can be provided in conjunction with a video stream (e.g., a combined stream, incorporating synchronized video and audio of a participant speaking).

In one implementation, the content archive 206 may be utilized by the conference platform 200 to store media collaboration data (e.g., store video and/or audio stream data, chat data, etc.), which may be accessible by one or more participants via their respective client devices at a later time. In some implementations, the content archive may be combined with the data store 106. The content archive may store content associated with public conversational events (e.g., public video chats, public audio chats, public text-based chats, public presentations, etc.), such that the public conversational events are searchable and retrievable at a later time.

In one implementation, the NLP server 130 includes a location enrichment component 250. The location enrichment component 250, as illustrated in FIG. 2, includes a content extraction module 252, a location identification module 254, a location association module 256, and a content generation module 258. More or less components may be included in the location enrichment component 250 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

In one implementation, the content extraction module 252 and the location identification module 254 may be utilized by the location enrichment component 250 to identify locations discussed within a media collaboration. The content extraction module 252, for example, may be utilized to transcribe audio into text from which location identifiers are extracted by the location identification module 254. Various NLP algorithms/techniques may be utilized for identifying and extracting contextual information from spoken and written language, as would be appreciated by one of ordinary skill in the art, including, but not limited to, speech recognition and processing, speech segmentation, topic segmentation, and word segmentation and disambiguation. The NLP algorithms/techniques may rely on a history of the media collaboration (e.g., multiple statements from multiple different users/participants) to establish a context for location identification. In some implementations, the location enrichment component 250 may access a natural language database 140, which may include a database of words and phrases to facilitate location extraction/identification.

In one implementation, the extracted location relates to places and people. For example, the extracted location may relate to a business (e.g., restaurant, stores, school, etc.), a destination (e.g., Eiffel tower, Grand Canyon, etc.), a city, a town, an address for a place (e.g., home address, etc.), and so on.

In one implementation, the location association module 256 may be utilized by the location enrichment component 250 to associate relevant location information with identified locations. The location association may be made by first determining location context information for one or more users/participants of the media collaboration. As discussed above, the location context of users/participants may refer to a current location of a user or user's device during the media collaboration. In one implementation, the location context of a user is determined based on one or more of a variety of inputs including, but not limited to, Wi-Fi signals, global positioning system (GPS) signals, cellular communication signals, Internet Protocol (IP) address information, web application programming interface (API) information, direct input from the user, and/or other sensor or configuration data associated with the user's device.

In some implementations, the location context of one or more users may include, in addition to information about the current location of the users' devices, historical data about locations that were previously visited or searched for by the one or more users. For example, if a user mentions a restaurant chain with multiple locations, implementations of the disclosure may decide to embed location information about the particular location of the restaurant chain that the user visits most frequently or has visited recently.

The location association may then use the extracted location and the location context of the users to identify location information, for example map and location data 293, for a geographic site (e.g., specific address, etc.) based on the extracted location and the location context of the users (if any). This location information is used to enrich the discussion of the location in the media collaboration. The location information may include, but is not limited to, a map, an address, latitude/longitude coordinates, navigation options, pictures, reviews, website link, application link, images, animations, music, videos, and so on. In some implementations, the relevant location information is maintained by a system providing the NLP server 130 and the conference server 120 (e.g., map and location data 293). In other embodiments, the relevant location information may be obtained from third-party systems that are indexed by searching the Internet and/or other knowledge sources that are accessible.

In some implementations, the location association techniques may utilize a certainty threshold (e.g., stored as location reference data 292) to determine whether an extracted location, in view of the location context of the users, relates to a geographic site. The certainty threshold may represent a probability that a geographic site relates to the extracted location/location context combination. When location information is identified by the location association techniques, the location information may be embedded in the media collaboration in order to enrich the discussion of the location.

In one implementation, the content generation module 258 may be utilized by the location enrichment component 250 to embed the relevant location information in the media collaboration. The location information may be embedded by automatically including the location information corresponding to the extracted location in the media collaboration for all users/participants to see. In another implementation, the location information may be embedded by providing a suggestion to the sending user (of the extracted location) to attach the location information corresponding to the extracted location in a message sent from the sending user in the media collaboration. If the suggestion is accepted, then the location information is presented to all users/participants in the media collaboration when the sending user sends his/her message. In a further implementation, the location information is presented to the sender in the media collaboration with an option to share the location information with the other users/participants in the media collaboration.

In some implementations, "embedding" the location information may refer to providing the location information as rendered object within the media collaboration. In other implementations, "embedding" the location information may refer to providing a selectable link (e.g., HTTP selectable hyperlink) in the media collaboration in order for users/participants to access the location information at a location (e.g., website, application, etc.) other than the media collaboration.

Some implementations described herein may be integrated into user interfaces operated on various client devices. A user interface may display the media collaboration and also display the relevant location information to enrich the media collaboration. The media collaboration may update in real-time as NLP extracts locations from the media collaboration and identifies relevant location information. In some implementations, a user/participant of the media collaboration can be provided an option to share relevant location information corresponding to an extracted location of the media collaboration with other users/participants in the media collaboration.

In general, functions described in one implementation as being performed by any of the conference server 120 or the NLP server 130 can also be performed by one or more of the client devices 110A-110Z in other implementations if appropriate. For example, the client device 110A may implement a software application that performs the functions of the location enrichment component 250. In addition, the functionality attributed to a particular component can be performed by different or multiple components operating together. In some implementations, the NLP server 130 can be accessed as a service provided to other systems or devices through appropriate application programming interfaces.

The conference platform 200 and the location enrichment component 250 were described as being implemented by the conference server 120 and the NLP server 130, respectively, but may be implemented by any of the client devices 110A-110Z, the conference server 120, or the NLP server 130. As an example, a client device (e.g., client device 110A) may be programmed to perform some or all of the functions of the conference platform 200 and/or the location enrichment component 250. As another example, the conference platform 200 and location enrichment component 250 may be combined together in the conference server. In implementations in which the conference platform 200 and/or the location enrichment component 250 are implemented on a client device, any functions described with respect to the conference platform 200 and/or the location enrichment component 250 that "receive", "transmit", "retrieve", "identify", "determine", etc., are understood to refer to functions performed by sub-systems or sub-modules within the client device rather than across a network (e.g., the network 105), as would be appreciated by one of ordinary skill in the art.

FIG. 3 is a diagram illustrating an exemplary graphical user interface (GUI) window 300 of a media collaboration service/application in accordance with an implementation of the disclosure. In one implementation, the GUI window 300 includes a main region 302, thumbnail regions 304A-304C, a header region 306, a chat region 308, and an options region 310. In some implementations, less than all of thumbnail regions 304A-304C may be present in the GUI window 300, or additional thumbnail regions may be present. The GUI window 300 may be generated for display as a user interface in combination with a media viewer of a client device (e.g., the user interface 111A and the media viewer 112A of the client device 110A).

In some implementations, each region can contain, depict, or otherwise present media content (e.g., video content) provided by a particular participant in a media collaboration. For example, the main region 302 may contain a video stream transmitted by a first participant (e.g., a "room" of the first or primary participants in a videoconference, video clips shared by the first participant, etc.), while each of the thumbnail regions 304A-304C may contain a miniaturized version of video streams transmitted by one or more additional participants, static images (e.g., an avatar, etc.) associated with the additional participants, miniaturized versions of video streams associated with the additional participants, or combinations thereof. It should be noted that although the regions of the GUI window 300 are depicted as rectangular, one or more of the regions may have some other shape (e.g., a circle, a trapezoid, etc.). Moreover, the shape, size, and/or layout of the GUI window 300 may depend on the device on which the GUI window 300 is to be presented. For example, as illustrated in FIG. 3, the GUI window 300 is formatted in a way that is suitable for a mobile device.

In one implementation, each of the main region 302 and the thumbnail regions 304A-304C may be associated with video streams generated by respective client devices of one or more participants in the video collaboration (e.g., video conference participants). Moreover, in certain implementations a particular region can change (e.g., from a thumbnail region to a major region) or switch the video streams displayed in the different regions depending on whether the participant associated with the region is speaking or not (e.g., using the interface module 204). Such a change can be performed automatically (e.g., without receiving any user request or detecting any user interaction). In some implementations, the conference platform 200 may receive the video streams and identify (e.g., using the interface module 204) which video stream corresponds to a current speaker or a focus of attention in general (e.g., the video stream corresponds to a participant that is hosting the media collaboration, a volume level of a speaker, a host selection of a particular participant, etc.).

In some implementations, a client device that implements the GUI window 300 may receive a composite content stream (e.g., that includes video/audio stream data generated by one or more of the client devices 110A-110Z) that was generated by the interface module 204 of the conference platform 200. The client device may be configured to extract content (e.g., one or more video/audio streams) from the composite content stream. In one implementation, the composite content stream includes metadata that specifies geometric properties corresponding to regions of the GUI window 300, such that video streams can be extracted from the composite content stream and mapped to the appropriate regions within the GUI window 300.

In one implementation, one of the thumbnail regions 304A-304C may transform or transition into the main region 302 (e.g., in response to a participant selecting/clicking on the thumbnail region or otherwise activating the thumbnail region), and vice versa. In some implementations, when a particular participant is speaking during a video conference, a video stream of the participant may be displayed within the main region 302. For example, if a video stream corresponding to a first participant is displayed in the main region 302 and the first participant is not speaking, a second participant's video stream may be "promoted" from one of the thumbnail regions 304A-304C to the main region 302 while the first participant's video stream is "demoted" to one of the thumbnail regions 304A-304C.

In one implementation, the composite content stream may include real-time chat data. For example, the chat data may be displayed within the chat region 308. The chat region 308 may provide a user/participant the opportunity to input chat messages and transmit the chat messages (e.g., to the conference server 120, which routes the chat messages to client devices of other participants). In one implementation, a list of available or related chats may be presented to the user. In one implementation, locations discussed during the chat may be identified using NLP techniques. In response to identifying the locations, the user or users may be presented with relevant location information corresponding to the location as an enrichment to the chat conversation, viewable, for example in main region 302, thumbnail region 304A-304C, and/or chat region 310.

In one implementation, the options region 310 may provide selectable options to a user. For example, the selectable options may allow the user to adjust settings of the media collaboration (e.g., display features, volume, etc.), invite additional users to participate in the media collaboration, receive content recommendations, provide content recommendations, rate or vote on the media collaboration and/or content presented during the media collaboration, request content related to a topic of the media collaboration (e.g., a currently discussed topic), etc. Options related to the embedding of location information in a media collaboration using natural language processing are described in greater detail with respect to FIGS. 4 and 5.

Figure 4:
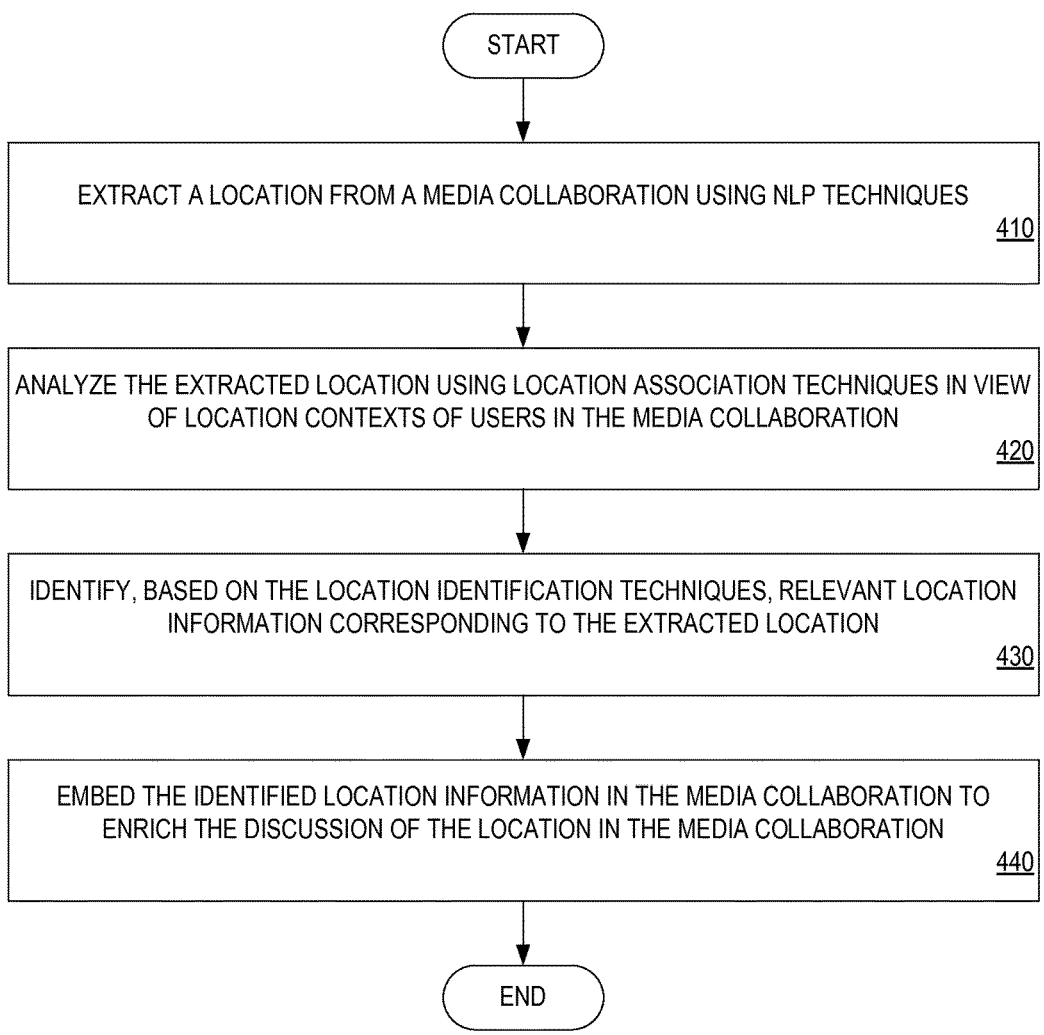
FIG. 4 is a flow diagram illustrating a method for embedding location information in a media collaboration using natural language processing in accordance with an implementation of the disclosure.
Figure 5:
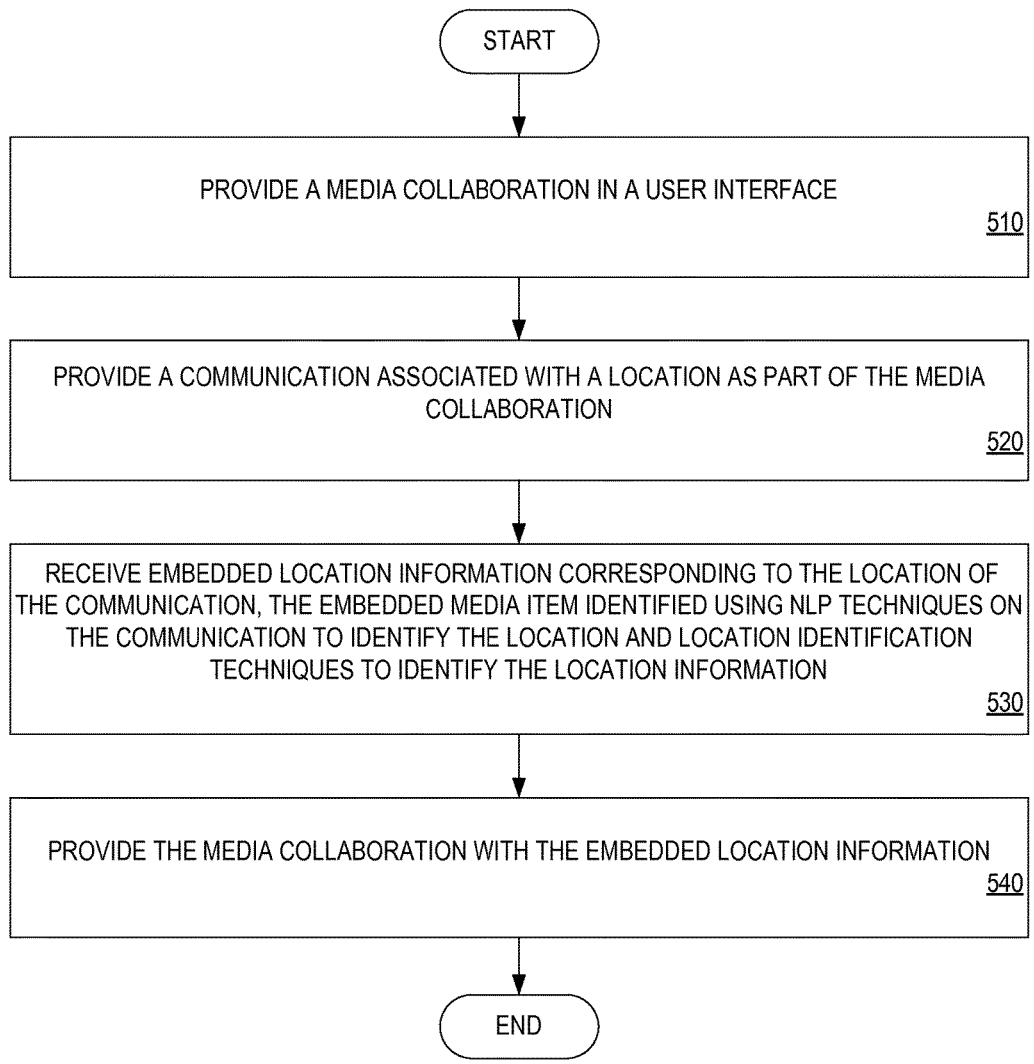
FIG. 5 is a flow diagram illustrating a method for providing, at a user device, embedded location information in a media collaboration using natural language processing in accordance with an implementation of the disclosure.

FIG. 4 is a flow diagram illustrating a method 400 for embedding location information in a media collaboration using natural language processing in accordance with an implementation of the disclosure, and FIG. 5 is a flow diagram illustrating a method 500 for providing at a user device embedded location information in a media collaboration using natural language processing in accordance with an implementation of the disclosure. The methods 400 and 500 may be performed by processing logic that includes hardware (e.g., circuitry, dedicated logic, programmable logic, microcode, etc.), software (e.g., instructions run on a processing device to perform hardware simulation), or a combination thereof.

Figure 6A:
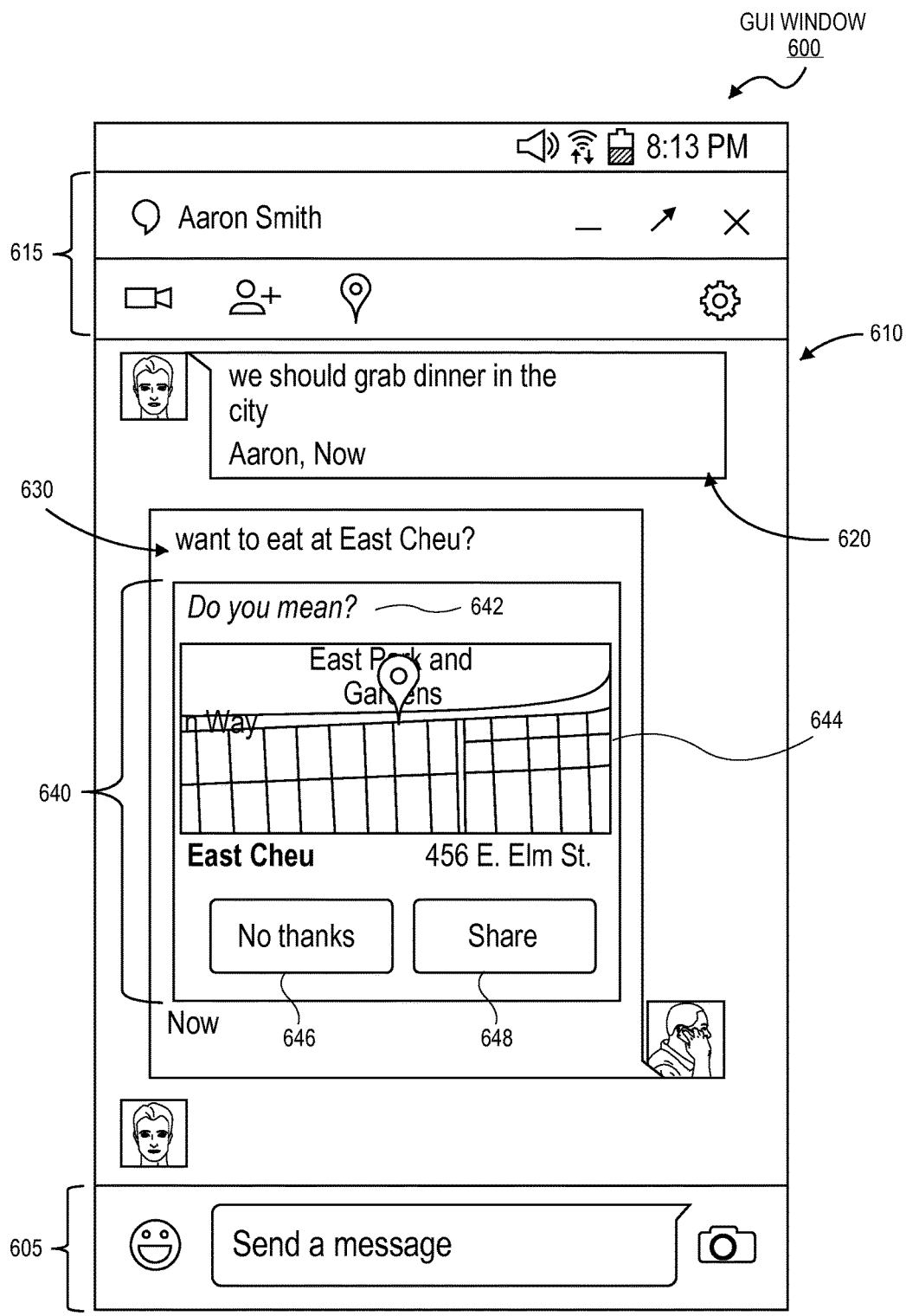
FIG. 6A is a block diagram illustrating a media collaboration interface in accordance with an implementation of the disclosure.
Figure 6B:
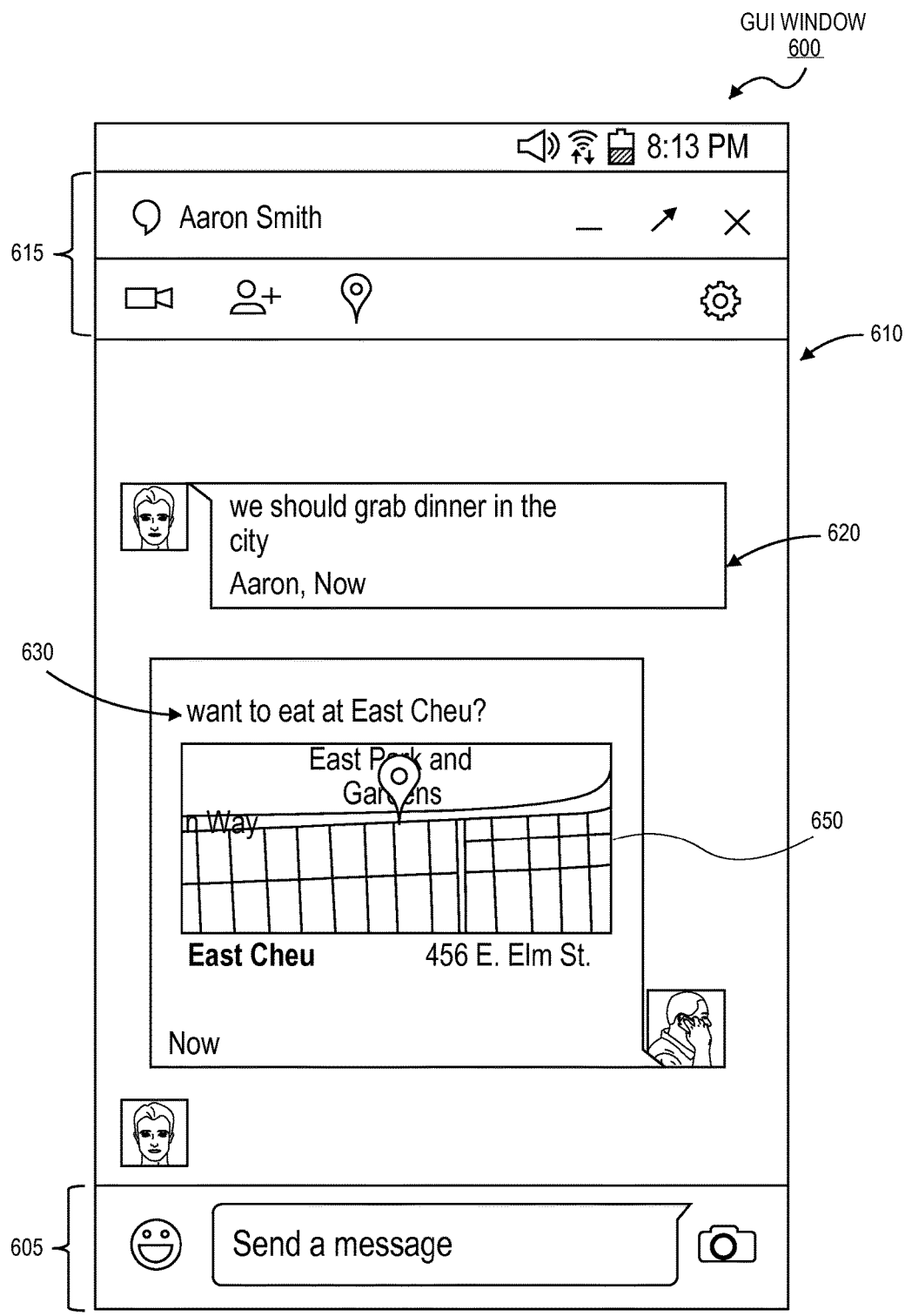
FIG. 6B is a block diagram illustrating another media collaboration interface in accordance with an implementation of the disclosure.

In some implementations, the method 400 may be performed by the location enrichment component 250 as described with respect to FIGS. 1 and 2. In some implementations, method 500 may be performed by client devices 110A-110Z as described with respect to FIG. 1. In describing the methods 400 and 500, reference is made to FIGS. 6A and 6B to illustrate various implementations. It is noted that the examples provided in FIGS. 6A and 6B are meant for illustrative purposes, and are not to be considered limiting implementations.

The operations of the methods 400 and/or 500 may be performed for a media collaboration (e.g., a video conference, an audio conference, a live video broadcast, a text-based chat, combinations thereof, etc.) according to various implementations of a system architecture (e.g., the system architecture 100). In one implementation, content streams, such as video streams generated/captured by client devices (e.g., client devices 110A-110Z) may be transmitted to a conference server (e.g., the conference platform 200 of the conference server 120), which are then transmitted to an NLP server (e.g., the location enrichment component 250 of the NLP server 130) for location extraction. In another implementation, the content streams are transmitted to the NLP server for location extraction prior to being received by the conference server, and then transmitted to the client devices (e.g., as a composite content stream). In another implementation, a content stream is generated/captured by a first client device (e.g., the client device 110A), and transmitted to the conference server 120, which performs location extraction. In another implementation a content stream is generated/captured by a first client device (e.g., the client device 110A), and transmitted to one or more additional devices (in which the first client device and/or one or more of the additional client devices performs location extraction).

Referring to FIG. 4, the method 400 begins at block 410 when a location is extracted from a media collaboration using NLP techniques. In some implementations, block 410 is performed by the content extraction module 252 and the location identification module 254. In one implementation, the extracted location relates to a person or place, such as a business, a destination, a home, a school, and so on.

In one implementation, the media collaboration may correspond to a live video recording, a pre-recorded video, a video conference, a video chat, an audio conference, and audio chat, a text-based chat, or combinations thereof. In some implementations, if the media collaboration includes an audio component, spoken language is transcribed into text (e.g., using the content extraction module 252), and a list of one or more locations may be extracted from the text using the location identification module 254. In other implementations, if the conversational event is entirely text-based (such as a sequence of chat messages), location identification may be performed directly without transcription. In some implementations, location extraction occurs in real-time during the conversational event.

In one implementation, the media collaboration is accessible to multiple users via media collaboration interfaces (e.g., user interfaces 111A-111Z) implemented on respective client devices of the users. For example, a media collaboration interface may be similar to GUI window 300, as illustrated in FIG. 3.

At block 420, the location is analyzed using location association techniques to locate location information corresponding to the location. In some implementations, block 420 is performed by the location association module 256. The location association techniques may utilize location context information gathered for one or more users/participants of the media collaboration. As discussed above, the location context of users/participants may refer to a current location of a user or user's device during the media collaboration. In one implementation, the location context of a user is determined based on one or more of a variety of inputs including, but not limited to, Wi-Fi signals, global positioning system (GPS) signals, cellular communication signals, Internet Protocol (IP) address information, web application programming interface (API) information, direct input from the user, and/or other sensor or configuration data associated with the user's device. The location association techniques use the location contexts to localize the extracted location (e.g., narrow down the location to a particular point). For example, if the user is discussing a business that is a chain with many different locations, the location association techniques may use the location contexts of the users to identify one of the many locations of the chain that is nearest to the user(s).

Subsequently, at block 430, the location association techniques may then use the extracted location and the location context of the users to identify location information for a geographic site (e.g., specific address, etc.). The location information may include, but is not limited to, a map, an address, latitude/longitude coordinates, navigation options, pictures, reviews, website link, application link, images, animations, music, videos, and so on. In some implementations, the location association techniques may utilize a certainty threshold to determine whether an extracted location, in view of the location context of the users, relates to the particular location information.

At block 440, when location information is identified by the location association techniques, the location information may be embedded in the media collaboration in order to enrich the discussion of the location. In one implementation, the content generation module 258 may be utilized to embed the relevant location information in the media collaboration. The location information may be embedded by automatically including the location information corresponding to the identified location in the media collaboration for all users/participants to see.

In another implementation, the location information may be embedded by providing a suggestion to the sending user of the location to attach the location information corresponding to the identified location in a message sent from the sending user in the media collaboration. If the suggestion is accepted, then the location information is shown to all users/participants in the media collaboration when the sending user sends his/her message. In a further implementation, the location information is shown to the sender in the media collaboration with an option to share the location information with the other users/participants in the media collaboration.

In some implementations, "embedding" the location information may refer to providing the location information as rendered object within the media collaboration. In other implementations, "embedding" the location information may refer to providing a selectable link (e.g., HTTP selectable hyperlink) in the media collaboration in order for users/participants to access the location information at a location (e.g., website, application, etc.) other than the media collaboration.

Referring to FIG. 5, the method 500 begins at block 510 when a media collaboration is provided in a user interface of a client device. As discussed above, the media collaboration may correspond to a live video recording, a pre-recorded video, a video conference, a video chat, an audio conference, an audio chat, a text-based chat, or combinations thereof. In one implementations, the user interface may be a media collaboration interface (e.g., user interfaces 111A-111Z) implemented on a respective client device of the user. For example, a media collaboration interface may be similar to GUI window 300, as illustrated in FIG. 3.

Then, at block 520, a communication associated with a location is provided as part of the media collaboration. For example, a user of the media collaboration may input the communication via the user interface at the client device and direct the first communication to be sent as part of the media collaboration. In another implementation, the communication may be received from another user/participant in the media collaboration. In one implementation, the location includes discussions with respect to geographic placement of a place or a person.

At block 530, embedded location information is received at the client device that corresponds to the location of the communication. In one implementation, the embedded location information is identified using NLP techniques on the communication to identify the location. In addition, location association techniques may be used to narrow down and/or specifically identify the location based on location context of users of the media collaboration. The location information may include, but is not limited to, map, an address, latitude/longitude coordinates, navigation options, pictures, reviews, website link, application link, images, animations, music, videos, and so on. In one implementation, the embedded location information may be identified according to method 400 described with respect to FIG. 4.

Subsequently, at block 540, the media collaboration is provided with the embedded location information. In one implementation, the content generation module 258 may be utilized to embed the location information in the media collaboration. The location information may be embedded by automatically including the location information corresponding to the identified location in the media collaboration for all users/participants to see. As an example, FIG. 6A illustrates a GUI window 600 for display of a media collaboration with embedded location information to enrich a discussion of a location identified using NLP techniques. As shown in FIG. 6A, the media collaboration is presented as a text-based chat. However, other implementations of a media collaboration may also be utilized.

The GUI window 600 includes a chat conversation 610 between multiple users. The user identification and chat controls can be found in menus 615 at the top of GUI window 600. When one of the users communicates via text input box 605 a desire to eat 620 and then another user responds 630 with the name of a restaurant (e.g., "East Cheu"), the location extraction of implementations of the disclosure identifies this location (i.e., as restaurant "East Cheu") as described above and locates relevant location information corresponding to the location after application of location association techniques to the identified topic. The location association techniques may determine the current geographic location of the chatting users, and use this to narrow down a particular location (e.g., geographic site) of the restaurant.

In one implementation, a location information suggestion 640 (e.g., preview) is provided to the user that sent 630 the name of the restaurant. The location information suggestion 640 may be presented to the sending user as a suggestion 642 to share a map and address 644 of the location (as identified by the location enrichment component 250). The user is provided the option to either accept/share 648 (e.g., provide permission to share) the suggestion 640, or decline 646 the suggestion 640.

If the user opts to share 648 the suggestion 640 of the location information, then FIG. 6B illustrates an example of the GUI window 600 subsequent to the user sharing the suggestion. In one implementation, GUI window 600 is the same as FIG. 6A and includes identically-named components. However, GUI window 600 now displays to all users of the chat conversation the location information 650 as confirmed and shared by the location-sending user. As such, the location information 650 for the discussed restaurant may be automatically identified based on application of NLP techniques to the chat conversation. In some implementations, the location information 650 may be automatically inserted, without user interaction, into the media collaboration shown in GUI window 600 for viewing by all users of the media collaboration.

In some implementations, "embedding" the location information may refer to providing the location information as rendered object within the media collaboration. In other implementations, "embedding" the location information may refer to providing a selectable link (e.g., HTTP selectable hyperlink) in the media collaboration in order for users/participants to access the location information at a location (e.g., website, application, etc.) other than the media collaboration.

For simplicity of explanation, the various implementations of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the implementations of the methods disclosed in this specification are capable of being stored on an article of manufacture to facilitate transporting and transferring such methods to computing devices. The term "article of manufacture", as used herein, is intended to encompass a computer program accessible from any computer-readable device or storage media.

Figure 7:
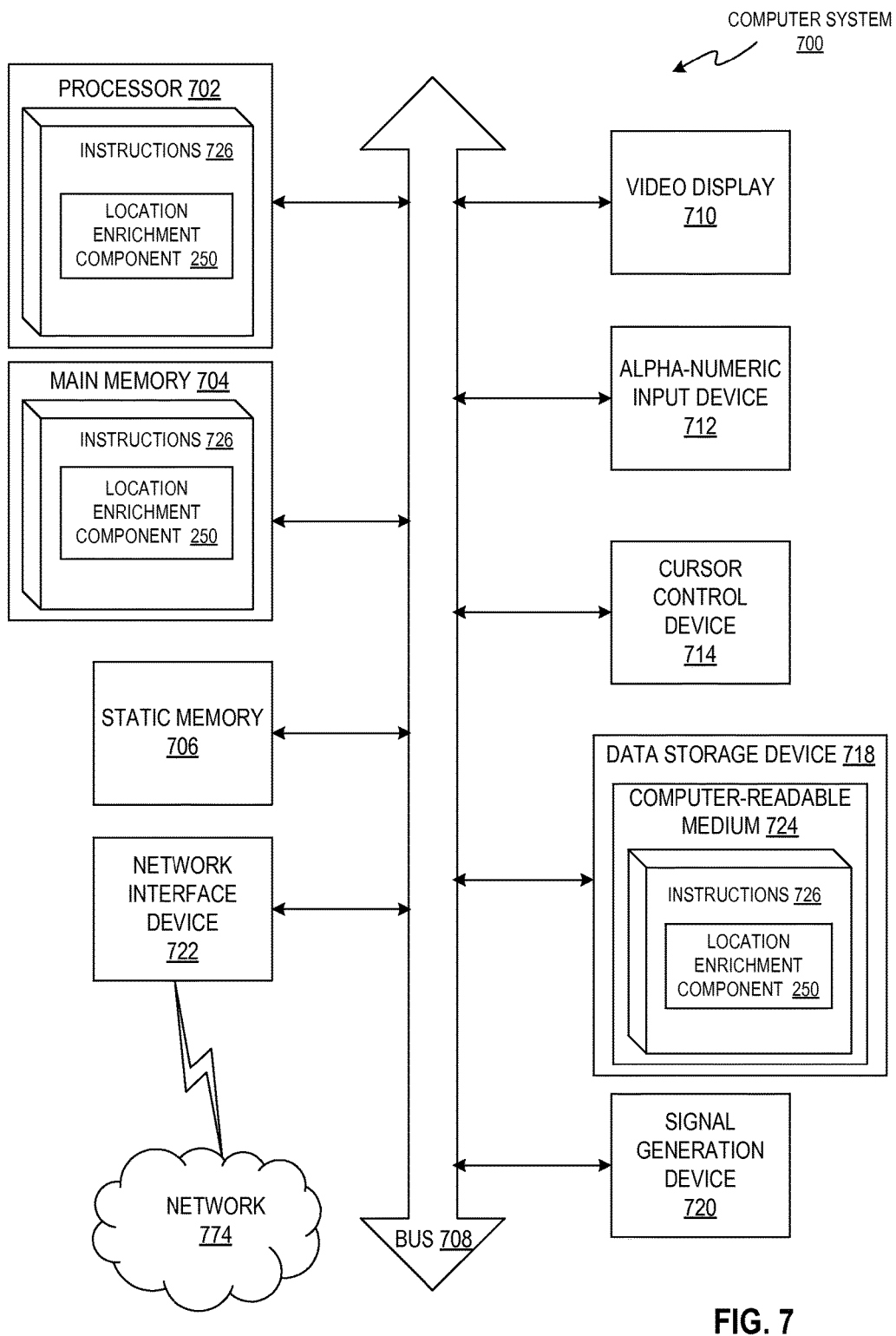
FIG. 7 is a block diagram illustrating an exemplary computer system in accordance with an implementation of the disclosure.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 700 may be utilized by or illustrative of one or more of the client devices 110A-110Z, the data store 106, the conference server 120, the NLP server 130, or the natural language database 140.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a DSP, network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 (e.g., the network 105) via the network interface device 722.

In one implementation, the instructions 726 include instructions for one or more location enrichment components 250, which may correspond to the identically-named counterpart described with respect to FIGS. 1 and 2. While the computer-readable storage medium 724 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory computer-readable storage medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "transmitting", "generating", "causing", "adding", "subtracting", "inserting", "including", "removing", "extracting", "analyzing", "determining", "enabling", "identifying", "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation. Moreover, it is noted that the "A-Z" notation used in reference to certain elements of the drawings is not intended to be limiting to a particular number of elements. Thus, "A-Z" is to be construed as having one or more of the element present in a particular implementation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, using natural language processing (NLP) techniques, a location discussed by users in a media collaboration, the media collaboration comprising a composite media stream generated from combining media streams transmitted from devices of the users;
   determining a location context of at least one user of the users, the location context comprising a geographic location of a device of the at least one user;
   identifying, based on the identified location and the location context, location information comprising a map corresponding to the identified location;
   generating, without user intervention, a preview of the location information identified using the NLP techniques, the preview comprising the map and a user interface (UI) element, the UI element to confirm sharing of the location information within the media collaboration;
   providing, without user intervention, the preview to the at least one user via a graphical user interface (GUI) of the media collaboration, the preview provided in a conversation portion of the GUI of the media collaboration without being visible to other users in the conversation portion of the GUI of the media collaboration;
   responsive to receiving an indication to share the location information via the UI element of the preview, providing, by a processing device to the other users, the location information comprising the map within the media collaboration; and
   responsive to receiving an indication that sharing of the location information is declined, removing the preview without sharing the location information in the media collaboration.

2. The method of claim 1, wherein the location comprises a place.

3. The method of claim 2, wherein the place comprises at least one of a business, a home, a destination, or a school.

4. The method of claim 1, wherein the location information further comprises at least one of an address, latitude and longitude coordinates, navigation options, reviews, website link, application link, images, animations, music, or videos.

5. The method of claim 1, wherein the location context is determined based on at least one of global positioning system (GPS) data, cellular data signals, sensor data, Wi-Fi signals, internet protocol (IP) addresses, web application programming interface (API) input, or direct input from the at least one user.

6. The method of claim 1, wherein including the location information further comprises embedding a selectable link to the location information in the media collaboration.

7. The method of claim 1, wherein the indication to share comprises permission from the at least one user to share the location information with other users in the media collaboration.

8. The method of claim 7, wherein the at least one user is a user that initially discussed the location.

9. The method of claim 1, wherein the media collaboration comprises at least one of a live video recording, a pre-recorded video, a video chat, or a text-based chat.

10. A system comprising:
    a memory; and
    a processing device communicatively coupled to the memory, wherein the processing device is to:
    identify, using natural language processing (NLP) techniques, a location discussed by users in a media collaboration, the media collaboration comprising a composite media stream generated from combining media streams transmitted from devices of the users;
    determine a location context of at least one user of the users, the location context comprising a map depicting a geographic location of a device of the at least one user;
    identify, based on the identified location and the location context, location information corresponding to the identified location;
    generate, without user intervention, a preview of the location information identified using the NLP techniques, the preview comprising the map and a user interface (UI) element, the UI element to confirm sharing of the location information within the media collaboration;
    provide, without user intervention, the preview to the at least one user via a graphical user interface (GUI) of the media collaboration, the preview provided in a conversation portion of the GUI of the media collaboration without being visible to other users in the conversation portion of the GUI of the media collaboration;
    responsive to receiving an indication to share the location information via the UI element of the preview, provide, to the other users, the location information comprising the map within the media collaboration; and
    responsive to receiving an indication that sharing of the location information is declined, remove the preview without sharing the location information in the media collaboration.

11. The system of claim 10, wherein the location comprises a place.

12. The system of claim 10, wherein the location information comprises at least one of a map, an address, latitude and longitude coordinates, navigation options, reviews, website link, application link, images, animations, music, or videos.

13. The system of claim 10, wherein the location context is determined based on at least one of global positioning system (GPS) data, cellular data signals, sensor data, Wi-Fi signals, internet protocol (IP) addresses, web application programming interface (API) input, or direct input from the at least one user.

14. The system of claim 10, wherein the processing device to include the location information further comprises the processing device to embed a selectable link to the location information in the media collaboration.

15. The system of claim 10, wherein the indication to share comprises permission from the at least one user to share the location information with other users in the media collaboration.

16. The system of claim 10, wherein the media collaboration comprises at least one of a live video recording, a pre-recorded video, a video chat, or a text-based chat.

17. A non-transitory computer-readable storage medium having instructions stored thereon that, when executed by a processing device, cause the processing device to perform operations comprising:
- identifying, using natural language processing (NLP) techniques, a location discussed by users in a media collaboration, the media collaboration comprising a composite media stream generated from combining media streams transmitted from devices of the users;
- determining a location context of at least one user of the users, the location context comprising a geographic location of a device of the at least one user;
- identifying, based on the identified location and the location context, location information comprising a map corresponding to the identified location;
- generating, without user intervention, a preview of the location information identified using the NLP techniques, the preview comprising the map and a user interface (UI) element, the UI element to confirm sharing of the location information within the media collaboration;
- providing, without user intervention, the preview to the at least one user via a graphical user interface (GUI) of the media collaboration, the preview provided in a conversation portion of the GUI of the media collaboration without being visible to other users in the conversation portion of the GUI of the media collaboration;
- responsive to receiving an indication to share the location information via the UI element of the preview, providing, by the processing device to the other users, the location information comprising the map within the media collaboration; and
- responsive to receiving an indication that sharing of the location information is declined, removing the preview without sharing the location information in the media collaboration.

18. The non-transitory computer-readable storage medium of claim 17, wherein the location information comprises at least one of a map, an address, latitude and longitude coordinates, navigation options, reviews, website link, application link, images, animations, music, or videos.

19. The non-transitory computer-readable storage medium of claim 17, wherein the location context is determined based on at least one of global positioning system (GPS) data, cellular data signals, sensor data, Wi-Fi signals, internet protocol (IP) addresses, web application programming interface (API) input, or direct input from the at least one user.

20. The non-transitory computer-readable storage medium of claim 17, wherein including the location information further comprises embedding a selectable link to the location information in the media collaboration.

21. The non-transitory computer-readable storage medium of claim 17, wherein the indication to share comprises permission from the at least one user to share the location information with other users in the media collaboration.

22. The non-transitory computer-readable storage medium of claim 17, wherein the media collaboration comprises at least one of a live video recording, a pre-recorded video, a video chat, or a text-based chat.

23. A user device comprising:
- a display device;
- a memory; and
- a processing device communicably coupled to the display device and the memory, wherein the processing device to execute instruction from the memory to cause the processing device to perform operations comprising:
  - providing, via a graphical user interface (GUI) displayed on the display device, a media collaboration, the media collaboration comprising a composite media stream generated from combining media streams transmitted from devices of users;
  - providing, via the GUI, a communication associated with a location as part of the media collaboration;
  - receiving embedded location information comprising a map corresponding to the location, the location identified using natural language processing (NLP) techniques on the communication and location association techniques to identify the location information;
  - receiving, without user intervention, a preview of the location information identified using the NLP techniques, the preview comprising the map and a user interface (UI) element, the UI element to confirm sharing of the location information within the media collaboration;
  - providing, without user intervention, the preview via a graphical user interface (GUI) of the media collaboration, the preview provided in a conversation portion of the GUI of the media collaboration without being visible to other users in the conversation portion of the GUI of the media collaboration, wherein the user is associated with the user device;
  - responsive to receiving an indication to share the location information via the UI element of the preview, providing, via the GUI, the embedded location information comprising the map as part of the media collaboration and visible within the media collaboration to the other users; and
  - responsive to receiving an indication that sharing of the location information is declined, removing the preview from the GUI without sharing the location information in the media collaboration.

24. The user device of claim 23, wherein the location information comprises at least one of a map, an address, latitude and longitude coordinates, navigation options, reviews, website link, application link, images, animations, music, or videos.

25. The user device of claim 23, wherein the location association techniques utilize the location and a location context of one or more users of the media collaboration to identify the location information, wherein the location context is determined based on at least one of global positioning system (GPS) data, cellular data signals, sensor data, Wi-Fi signals, internet protocol (IP) addresses, web application programming interface (API) input, or direct input from the at least one user.

* * * * *